United States Patent [19]

Siemer et al.

[11] 4,148,020

[45] Apr. 3, 1979

[54] FAIL-SAFE ALARM SYSTEM UTILIZING FREQUENCY MODULATED SIGNAL DETECTION

[76] Inventors: Dennis K. Siemer, 217 Viking Dr.; Swen E. Farland, Rte. 5, Box 100, both of Mankato, Minn. 56001

[21] Appl. No.: 826,654

[22] Filed: Aug. 22, 1977

[51] Int. Cl.² .............................................. G08B 13/22
[52] U.S. Cl. ..................................... 340/531; 340/288; 340/310 R; 340/538; 340/539; 325/30
[58] Field of Search ................... 340/213 R, 216, 224, 340/310 R, 310 A, 409, 412, 253 C; 343/228; 325/30, 64

[56] References Cited

U.S. PATENT DOCUMENTS

| 3,939,460 | 2/1976 | Horn et al. | 340/408 |
| 3,969,709 | 7/1976 | Isaacs et al. | 340/224 |
| 3,978,479 | 8/1976 | Schmitz | 340/420 |

Primary Examiner—Alvin H. Waring
Attorney, Agent, or Firm—Merchant, Gould, Smith, Edell, Welter & Schmidt

[57] ABSTRACT

An alarm system for transmitting an alarm signal between remote locations utilizing frequency shift keying over conventional power lines. The alarm system includes a transmitter having a nominal frequency and circuitry for modulating the transmitter frequency. Upon detection of an alarm condition the modulating circuitry is disabled. A receiver is provided and has circuitry for detecting the presence or absence of modulation of the transmitter frequency. The receiver generates an alarm signal upon detection of absence of modulation and power failure of the system. The alarm signal is time-delayed to prevent nuisance alarms.

9 Claims, 6 Drawing Figures

FAIL-SAFE ALARM SYSTEM UTILIZING FREQUENCY MODULATED SIGNAL DETECTION

BACKGROUND OF THE INVENTION

The present invention relates broadly to an alarm system for monitoring the presence or absence of alarm conditions at a remote location. In particular, the present invention is an alarm system that includes a transmitter positioned at a remote location and connected to a receiver over conventional power or communication lines. The transmitter generates a signal representative of the presence of absence of an alarm condition and the generated signal is received and processed at the monitoring location by the receiver.

It is often desirable to monitor conditions at remote locations for detection of conditions that require attention. For example, in agricultural applications it is often desirable to monitor a plurality of conditions within lifestock confinement buildings. Such buildings are typically located some distance from the dwelling or residence of the cattleman or farmer and it is imperative that he be alerted upon occurrence of an abnormal condition within the livestock confinement area. In addition to fire detection, the cattleman or farmer may also want to monitor temperature, water pressure, presence or absence of power, and the opening of the door or windows of the confinement building. It is also desirable that the alarm at the monitoring location not be triggered in response to spurious nuisance alarm signals, such as a brief power failure. Additionally, it is also desirable to have an alarm system which will also be triggered upon loss of power at the monitoring location. If such a feature is not provided, alarm conditions at the monitored location may go undetected for a significant period of time resulting in extensive damage to the livestock. For example, if the temperature in the confinement building were allowed to increase above the desirable range without detection, the livestock may be subjected to severe stress and, perhaps, even death.

Alarm systems which have receivers and transmitters connected over conventional power lines are known in the prior art. Typically such prior art systems include continuous wave transmission at a predetermined frequency. Such systems are particularly susceptible to AC line noise. One prior art system also incorporates amplitude modulation in the transmission and detection circuitry. Amplitude modulated signals, however, are more prone to noise interference than frequency modulated systems. Additionally, the prior art systems have no provision for monitoring loss of power at the receiver or monitoring location.

The present invention eliminates the disadvantages of the prior art alarm systems in that it incorporates frequency shift keying in a substantially fail-safe system which generates an alarm in response to the detection of an alarm condition at the transmitter location and also generates an alarm in response to power failure at either the transmitter or receiver. The alarm system of the present invention operates with a modulated radio frequency signal connected over conventional power lines between the receiver and transmitter. The alarm system is therefore essentially immune from AC line noise. The alarm system of the present invention also includes time delay circuitry that functions to generate a valid alarm indication only after a predetermined time delay following detection of an alarm condition or power failure. Nuisance alarms are thereby eliminated in the present invention. The alarm system of the present invention is readily adaptable for monitoring a plurality of conditions at a remote location. Each such condition is provided with independent receiver and transmitter circuitry operating on different nominal frequencies or channels.

SUMMARY OF THE INVENTION

The present invention is an alarm system for transmitting an alarm signal between remote locations and includes a transmitter having a means for generating a first signal in response to the detection of an alarm condition. A receiver at a monitoring location is connected to the transmitter and has circuit means for detecting the first signal and generating a second signal representative of an alarm condition. An alarm trigger circuit is provided and has a circuit means responsive to the second signal and to the loss of power at the transmitter or receiver for generating a time delay alarm signal.

In the preferred embodiment, the transmitter includes the frequency generator for generating an output signal at a predetermined nominal frequency. A frequency modulator means is provided to modulate the transmitter output signal about the nominal frequency. The transmitter further includes a circuit means that is responsive to the presence of an alarm condition to disable the frequency modulator means whereby the transmitter output signal is a singal having a nominal unmodulated frequency. A receiver is connected to the transmitter over conventional power lines and has circuit means for detecting the presence or absence of modulation of the output signal of the transmitter in generating a signal representative thereof. An alarm trigger circuit means is responsive to the signal generated by the detection circuit means of the receiver and to loss of power in the transmitter or receiver for generating a time delay signal representative of an alarm condition.

The alarm trigger circuit includes, in the preferred embodiment, a P-N-P transistor having its emitter connected to a source of positive potential of a first value provided by a battery. The base of the transistor is connected to a voltage divider which is in parallel with a capacitor. Circuit means are provided for applying second and third voltage potentials to the capacitor as a function of alarm conditions or power failure. The second potential has a value greater than the first potential applied to the emitter and maintains the capacitor fully charged. The voltage divider connected in parallel with the capacitor applies a potential to the base of the transistor greater than the first potential on the emitter, maintaining the transistor off. This condition corresponds to a non-alarm condition. Upon detection of an alarm condition or failure of power, the third potential, i.e., zero volts, is applied to the parallel connected capacitor and voltage divider. The capacitor thereby discharges through the voltage divider until the voltage on the base of the transistor is less than the voltage applied to the emitter whereby the transistor turns on and after a predetermined time delay fixed by the RC time constant of the transistor biasing circuit generates the signal indicating an alarm.

The frequency generator in the receiver is a ceramic resonator having a nominal frequency. A capacitor is connected in parallel with the resonator through a switch which is turned on and off by a modulating signal. The output signal of the generator therefore, has a frequency that is modulated at a rate corresponding to the frequency of the modulating signal. The modulating signal is disabled in response to detection of an alarm condition by shunting the modulating signal to bypass the switch means.

From the above description, it can be appreciated that the present invention eliminates a number of the significant disadvantages of the prior art systems in that it is a frequency modulated system substantially immune from AC line noise. Additionally, the alarm system of the present invention is failsafe in that it provides for an alarm signal in response to loss of power at the transmitter and receiver in addition to detection of a specific alarm condition. The alarm system of the present invention is easily adaptable to multiple channel operation, each channel having an independent nominal frequency and associated with a separate monitored condition. These and other advantages of our invention will become apparent with reference to the accompanying drawings, detailed description of the preferred embodiment, and claims.

DETAILED DESCRIPTION OF THE PREFERRED EMBODIMENT

Figure 1:
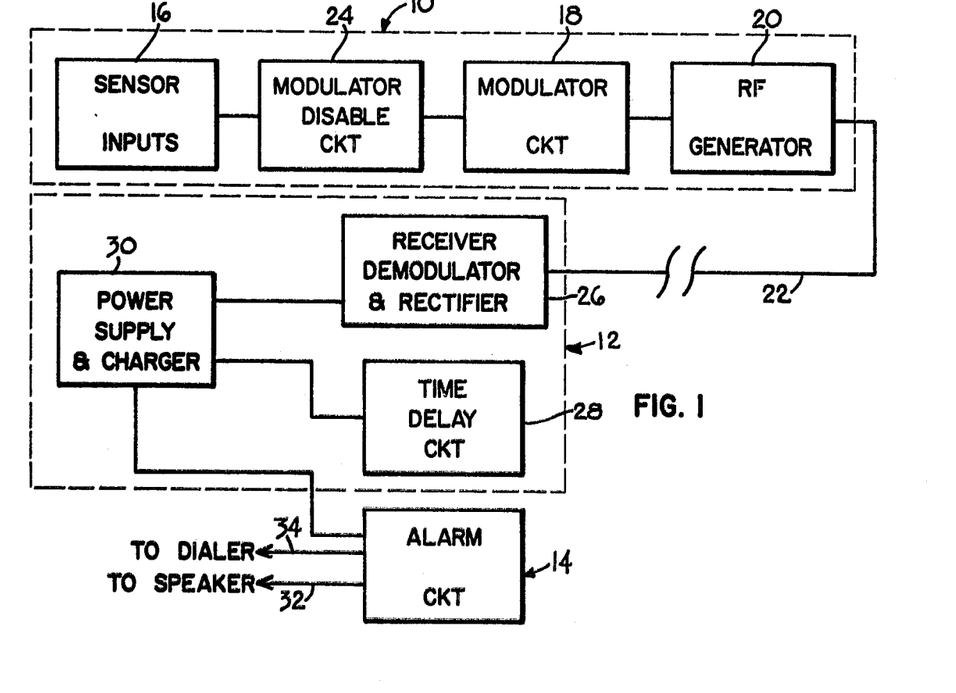
FIG. 1 is a block diagram representation of the alarm system of the present invention.

Referring to the drawings, wherein like numerals represent like parts throughout the several views, FIG. 1 illustrates in block diagram form the alarm system incorporating the present invention. The alarm system includes a transmitter designated generally as 10, a receiver designated generally as 12, and an alarm circuit 14. Transmitter 10 includes sensor inputs 16 that are connected to appropriately selected sensing devices (not shown) to monitor selected conditions at a desired location. For example, the present invention is particularly applicable in livestock confinement buildings wherein it may be desirable to monitor temperature within the building, whether or not power is being supplied to the building, whether or not the building door is open or closed, and other environmental conditions within the confinement area. The present invention, of course, is not limited to livestock confinement buildings and has applicability in general as an alarm system for monitoring remote locations. Transmitter 10 also includes a modulator circuit 18 which is connected to a frequency generator 20. Frequency generator 20 produces an output signal which is transmitted along conventional power lines or communication lines 22 to receiver 12 at a monitoring location. Typically, in the application to livestock confinement buildings, receiver 12 will be located in the rancher's or farmer's home. Transmitter 10 includes a modulator disable circuit 24 connected to sensor inputs 16 to receive a signal therefrom indicative of an alarm condition. Modulator disable circuit 24 is connected to modulator circuit 18 to regulate the effect of modulator circuit 18 on generator 20. As will be described in more detail hereafter, under normal or non-alarm conditions, modulator circuit 18 modulates the frequency of the output signal of generator 20 that is supplied over lines 22 to receiver 12.

Receiver 12 includes a demodulator and rectifier circuit 26 which receives the frequency modulated signal from transmitter 10 on lines 22. Demodulator and rectifier circuit 26 is connected to a time delay circuit 28 and provides an output signal to time delay circuit 28 that is representative of the presence or absence of modulation of the frequency signal from transmitter 10. Demodulator and rectifier circuit 26 detects the presence or absence of modulation in the signal from transmitter 10 and generates an output signal applied to time delay circuit 28 which is representative of the presence or absence of such modulation. Receiver 12 also includes an integral DC power supply and charger circuit 30 which is connected to time delay circuit 28 and alarm circuit 14 to provide a source of DC power thereto. As will be described in more detail hereafter, power supply and charger circuit 30 provides a source of DC power to time delay circuit 28 and alarm circuit 14 so that an alarm signal will be generated upon the loss of power in addition to detection of an alarm condition by sensor inputs 16. Alarm circuit 14 has an output line 32 connected to a speaker or horn that emits an audible signal under alarm conditions. A second output line 34 may be provided for connection to a telephone dialer circuit which will dial a preselected number when an alarm is indicated. For example, in the application to livestock confinement buildings the preselected number could be that of a convenient neighbor of the farmer who would be alerted of the alarm in the event that the farmer is not home when the alarm is triggered.

Figures 2, 2A:
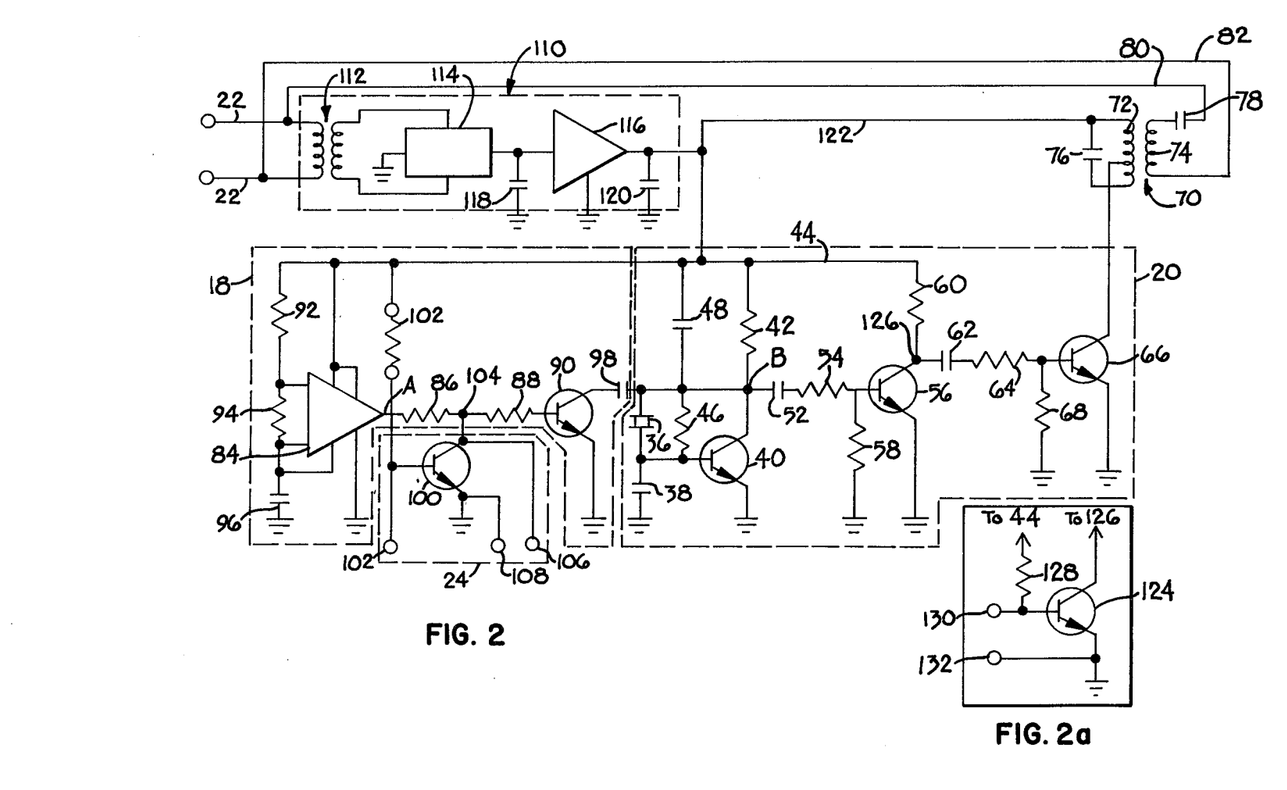
FIG. 2 is a detailed schematic of the transmitter of the present invention in the continuous run mode of operation.
FIG. 2A illustrates schematically an alternative transmit-upon-command mode of operation of the transmitter shown in FIG. 2.

FIG. 2 illustrates in greater detail the elements comprising transmitter 10 in the preferred embodiment. Frequency generator 20, as shown in dashed lines in FIG. 2, includes a ceramic resonator controlled oscillator 36 connected through a capacitor 38 to ground and to the base of a transistor oscillator 40. Transistor 40 has a grounded emitter with its collector connected to a resistor 42 to a positive DC potential applied on line 44. The base of transistor 40 is also connected through a resistor 46 in series with a capacitor 48 to line 44. Resonator 36 is in parallel with resistor 46 and generates a signal at a selected nominal frequency. In the preferred embodiment, resonator 36 has a nominal frequency between 200 and 240 KHz. A signal having the nominal frequency of ceramic resonator 36 appears on the collector of transistor 40 at junction point 50. The signal at point 50 is fed through a capacitor 52 and resistor 54 to the base of a buffer amplifier transistor 56. A resistor 58 is connected between the base of transistor 56 and ground. The emitter of transistor 56 is also connected to ground while the collector is connected to line 44 through a load resistor 60. The signal on the collector of transistor 56 is an amplified signal also having the nominal frequency of ceramic resonator 36. This signal is applied through capacitor 62 and resistor 64 to the base of an output amplifier 66. Resistor 68 is connected between the base of transistor 66 and ground while the emitter of transistor 66 is also connected to ground. The output signal on the collector of transistor 66 is a further amplified signal having the nominal frequency of the ceramic resonator. This signal is applied to the resonant adjustable transformer 70 which includes a primary coil 72 and a secondary coil 74. Transformer 70 also includes a primary coil capacitor 76 and a blocking capacitor 78. The signal from the collector of transistor 66 is applied to primary coil 72 and is transmitted through secondary coil 74 and blocking capacitor 78 to lines 80 and 82 which are connected to conventional power line 22 in the preferred embodiment.

Modulator circuit 18 includes a conventional integrated circuit timer chip 84 which is selected to generate a square wave output signal at a modulating frequency. The modulating frequency in the preferred embodiment is 15 Hz. The output signal from timer chip 84 is fed through resistors 86 and 88 to the base of a transistor 90. Timer chip 84 can be selected from a number of conventional chips manufactured by various companies. One such circuit chip is made by Motorola and carries the designation NE 555. The associated timer chip circuitry includes resistor 92, resistor 94, and capacitor 96. Transistor 90 has its emitter connected to ground and its collector through a capacitor 98 to one terminal of ceramic resonator 36. The 15 Hz input signal on the base of transistor 90 functions to turn transistor 90 on and off at a 15 Hz rate. When transistor 90 is turned on, capacitor 98 is connected through the collector and emitter of transistor 90 to ground. Capacitor 98 is therefore connected in parallel with ceramic resonator 36 when the transistor 90 is on. Capacitor 98 has a value selected to drop the frequency of the signal generated by ceramic resonator 36, approximately 500 Hz, during the period of time that transistor 90 is on. When transistor 90 is turned off, capacitor 98 is disconnected from ground and the signal generated by ceramic resonator 36 returns to the nominal frequency. Thus, it can be seen that the modulation of the output signal from generator 20 occurs at a 15 Hz rate.

Modulator disable circuit 24 includes a switching transistor 100 having its base connected to a resistor 102 to line 44. The base of transistor 100 is also connected to a signal input contact 102. Transistor 100 has a grounded emitter and its collector is connected at junction point 104 between resistors 86 and 88. Transistor 100 also has a collector signal input terminal 106 and an emitter signal input terminal 108. The modulation of the frequency signal generated by ceramic resonator 36 is disabled by shunting the 15 Hz modulation signal generated by time chip 84 from junction point 104 to ground. In one embodiment, input contacts 102 and 108 may be connected to a sensor input which maintains the contacts normally closed. With contacts 102 and 108 closed, the potential on the base of transistor 100 is essentially zero and transistor 100 remains off. When, in response to an alarm condition, the contacts 102 and 108 are opened, a biasing DC potential is applied to the base of transistor 100 through biasing resistor 102 turning transistor 100 on. Junction point 104 is thus shunted to ground thereby shunting the modulating 15 Hz signal to ground. When the modulating signal is thereby shunted to ground, transistor 90 remains off and the signal generated by ceramic resonator 36 remains at the nominal frequency of the resonator.

In an alternative embodiment, input contacts 106 and 108 may be connected to a sensor input which maintains the contacts normally open. In this embodiment, resistor 102 may be eliminated. When contacts 106 and 108 are closed in response to the detection of an alarm condition, junction point 104 is connected directly to ground. The 15 Hz modulating signal is thereby connected directly to ground and thus the frequency modulation of the signal produced by ceramic resonator 36 is terminated.

Transmitter 10 also includes a rectifier circuit designated generally as 110. Rectifier circuit 110 includes a transformer 112, a rectifier 114, an operational amplifier 116 and capacitors 118 and 120. Rectifier 114 and amplifier 116 are commercially available components. Applicable rectifier 114 and amplifier 116 devices are manufactured by General Instrument under the designation W005M and Fairchild 78L12, respectively. Rectifier circuit 110 is connected to the power lines 22 and provides a 12 volt DC potential to line 44. The 12 volt potential is also connected by line 122 to capacitor 76.

The above description of transmitter 10 has been with reference to the continuous run mode of operation. In the transmit-upon-command mode of operation, a switching transistor 124 has its collector connected to the collector of transistor 56 at junction point 126. The base of transistor 124 is connected through a biasing resistor 128 to line 44. The emitter of transistor 124 is grounded. Transistor 124 has a pair of input terminals 130 and 132 connected to the base and emitter respectively. Contacts 130 and 132 in the transmit-on-command mode of operation are normally open. Thus, a positive DC potential is applied to base 124 turning transistor 124 on. Junction point 126 is thereby shunted to ground through the collector and emitter of transistor 124. The output signal from transistor 56 is therefore shunted to ground. When it is desirable to transmit, contacts 130 and 132 are closed dropping the potential at the base of transistor 124 substantially to zero turning off transistor 124 and permitting the output signal of transistor 56 to pass to output amplifier 66. In the transmit-on-command mode of operation, contacts 130 and 132 may be closed in any selected fashion, such as a switch either manually operated or operable upon detection of an alarm condition.

Figures 3, 3A:
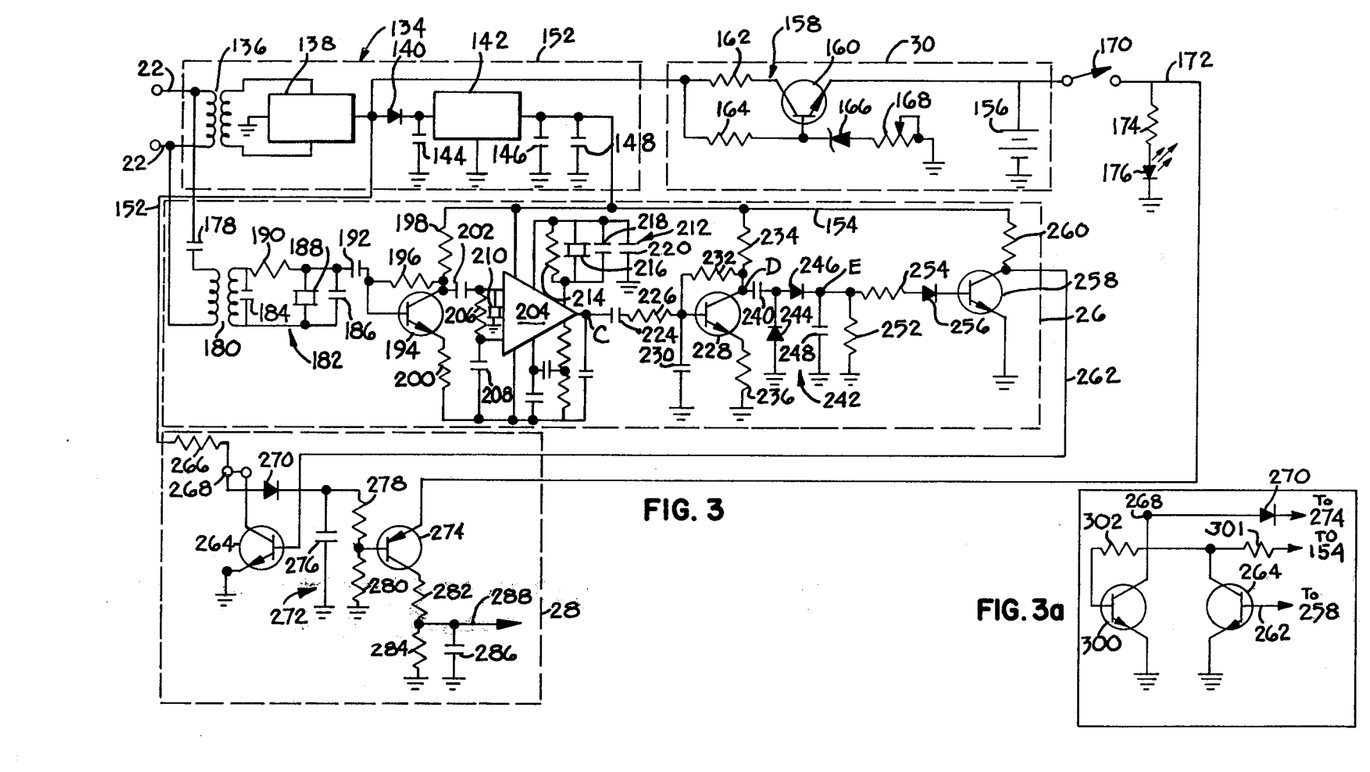
FIG. 3 is a detailed schematic of the receiver of the alarm system of the present invention.
FIG. 3A is a schematic diagram of a portion of the receiver circuit shown in FIG. 3 illustrating an alternative transmit-upon-command mode of operation.

In either the continuous run or transmit-on-command mode of operation, the output signal from transistor 66 is connected through transformer 70 to the conventional power lines 22 where it is received by receiver 12 which is illustrated in more detail in FIG. 3. Receiver 12 also includes a rectifier circuit designated generally as 134. Rectifier circuit 134 includes a transformer 136 connected to the power lines 22, a rectifier circuit 138, a diode 140, an integrated circuit 142 and capacitors 144, 146 and 148. Rectifier 134 provides a 12 volt DC potential on conductors 152 and 154.

Power supply and charger circuit 30 includes a battery 156 which in the preferred embodiment is a six volt DC power source. Power supply and charger 30 also includes a conventional trickle charger circuit 158 having a transistor 160. The collector of transistor 160 is connected through a resistor 162 to conductor 152 and the source of DC potential from rectifier 134. The emitter of transistor 160 is connected to the positive potential terminal of battery 156. The base of transistor 160 is connected through a resistor 164 to conductor 162 and through a zener diode 166 and variable resistor 168 to ground. A manually operable switch 170 establishes electrical continuity between battery 156 and a conductor 172. A resistor 174 and light emitting diode 176 are connected between conductor 172 and ground to provide a visual indication of the sufficiency of the charge on battery 156. Trickle charging circuit 158 maintains battery 156 at the desired operating potential.

Demodulator and rectifier circuit 26 is connected to the conventional power lines 22 through a capacitor 178 and a resonant transformer 180. The signal on the secondary of resonant transformer 180 is applied to a filter circuit 182 that includes parallel connected capacitors 184 and 186 and an input filter resonator 188. A resistor 190 is connected between capacitor 184 and resonator 188 and circuit 182 has an output capacitor 192. The filtered signal output of filter circuit 182 is applied to the base of a transistor amplifier 194. A biasing resistor 196 is connected between the base and collector of transistor 194. The collector of transistor 194 is also connected through a collector resistor 198 to conductor 154 to which is applied the 12 volt DC source of positive potential. Transistor 194 also has an emitter resistor 200. The amplified signal from transistor 194 is applied through a capacitor 202 to the input of an integrated circuit chip 204. Connected across the input of integrated circuit chip 204 is a series connected resistor 206 and capacitor 208 and a grounded ceramic resonator 210 which functions as a filter. Integrated circuit chip 204 is a conventional commercially available FM receiver subsystem and includes an FM IF amplifier-limiter, a differential peak detector, and an audio preamplifier. Integrated circuit chip 204 has a detector stage 212 that includes parallel connected resistor 214, ceramic reasonator 216 and capacitor 218 connected in series to ground with a capacitor 220. The output signal from integrated circuit chip 204 appearing at C is the recovered 15 Hz square wave modulating signal generated by modulator circuit 18 of transmitter 10. This signal is applied through capacitor 224 and resistor 226 to the base of a transistor 228. A capacitor 230 is connected between the base of transistor 228 and ground and a resistor 232 is connected between the base of transistor 228 and the transistor collector. The transistor collector is also connected through resistor 234 to conductor 154. The emitter of transistor 228 is grounded through resistor 236. The output signal of transistor 228 appearing at D is a 5 volt peak-to-peak square wave having a frequency of 15 Hz. This signal is applied through capacitor 240 to a rectifying and filtering circuit consisting of diodes 244 and 246 and capacitor 248. The signal produced at E is, therefore, a step voltage of two to three volts DC. This signal is applied through a resistive biasing network including resistors 252 and 254 and a diode 256 to the base of a switching transistor 258. The emitter of switching transistor 258 is grounded and the collector is connected through the resistor 260 to the source of positive potential on conductor 154. The output signal on collector of transistor 258 is applied over conductor 262 to time delay circuit 28.

Time delay circuit 28 includes a switching transistor 264 having a grounded emitter and a collector connected to resistor 266 to the 12 volt DC source of potential on conductor 152. The collector of transistor 264 is also connected at junction point 268 through a diode 270 to a biasing circuit 272 associated with a transistor 274. Biasing circuit 272 includes a capacitor 276 and voltage dividing resistors 278 and 280 connecting to the base of transistor 274. Transistor 274 is a P-N-P transistor having its emitter connected to line 172 on which is applied the 6 volt DC potential from power source 156. The collector of transistor 274 is connected to ground through a voltage divider resistor pair 282 and 284. An output capacitor 286 is connected in parallel with resistor 284. A signal indicative of alarm conditions is applied on line 288 to a conventional alarm circuit 14 that includes an audible alarm, typically in the form of a horn.

FIG. 3A illustrates an alternative circuit for the transmit-on-command mode of operation. In particular, a signal inverting transistor 300 is provided having its collector connected to junction 268, a grounded emitter, and a base connected through resistor 302 to the collector of transistor 264. The collector of transistor 264 is disconnected from junction 268. In this mode of operation transistor 258 will normally be OFF and transistor 264 is normally ON. With transistor 264 ON, transistor 300 is held OFF, thereby applying a 12 volt potential at junction 268 maintaining capacitor 276 fully charged. When transistor 258 turns ON in response to an alarm condition in the transmit-on-command mode of operation, transistor 264 turns OFF and transistor 300 turns ON dropping the potential applied at junction 268 and allowing capacitor 276 to discharge.

Figure 4:
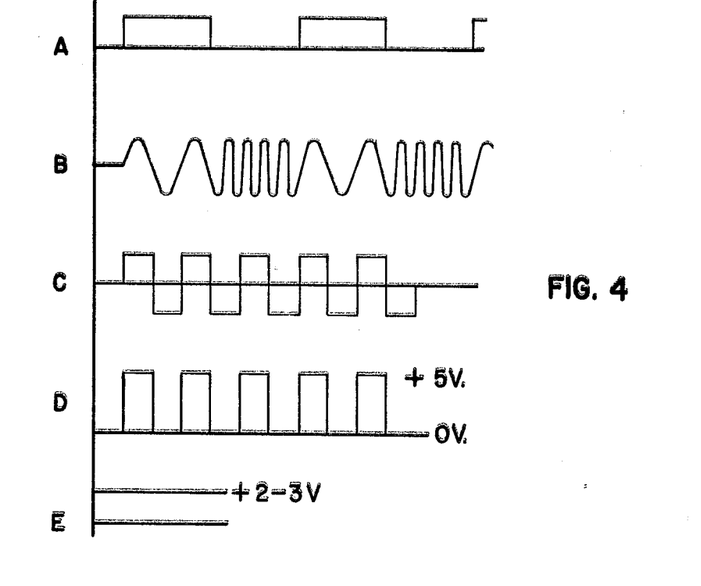
FIG. 4 graphically illustrates waveforms at various locations in the schematic of FIG. 2 and FIG. 3.

The operation of the invention will now be described with particular reference to FIGS. 2–4 in the continuous run mode. Integrated circuit timer chip 84 generates a 15 Hz square wave signal at A. The waveform at A is shown in FIG. 4. Under normal or non-alarm conditions the square wave signal at A applied to the base of transistor 90 turning transistor 90 ON and OFF at the 15 Hz rate. When transistor 90 is ON, capacitor 98 is placed in parallel with ceramic resonator 36 dropping the frequency at B approximately 500 Hz. When transistor 90 is OFF, the frequency of the signal at B is the nominal frequency of ceramic resonator 36. The waveform of the signal at B is illustrated in FIG. 4. Thus, as long as the 15 Hz signal is applied to transistor 90 the frequency of the signal at B will be periodically shifted at a 15 Hz rate. As previously mentioned, typical nominal frequency of ceramic resonator 36 is 200 KHz. The output signals of transistors 56 and 66 are amplified signals having the frequency characteristics of the waveform shown in FIG. 4B. The frequency shifted output signal from transistor 66 is connected through transformer 70 to the conventional power lines 22. It is to be understood that it is contemplated that the signal between transmitter 10 and receiver 12 could be transmitted over other conventional available communication lines, such as telephone lines.

Upon detection of an alarm condition at the transmitter, the modulating 15 Hz signal at A is shunted between junction point 104 and ground through switching transistor 100. Transistor 90 therefore remains OFF during alarm conditions and the signal at B has the non-shifted nominal frequency of ceramic resonator 36. Therefore, under an alarm condition the output signal from transistor 66 which is applied over power lines 22 is a signal having the nominal frequency of resonator 36.

The signal on power lines 22 is coupled through resonant transformer 180 to an input filter circuit 182. The output of filter circuit 182 is amplified and fed to integrated circuit chip 204. As previously mentioned, integrated circuit chip 204 is a conventional FM receiver subsystem, for example, one commercially available chip is manufactured by RCA with Model No. CA3075. A ceramic resonator 216 is utilized in the external detector subsystem in place of a conventional RLC circuit. Ceramic resonator 216 provides a more stable and accurate detector since it will not shift frequency as a function of temperature and handling.

Resistor 214 broadens the bandwidth resonator 216 and capacitor 218 lowers the resonant frequency of resonator 216 so that the detector circuit has the same mid-frequency as transmitter resonator 36 and filter resonators 188 and 210. Capacitor 220 is provided to increase the amplitude of the recovered 15 Hz modulation signal.

The output of integrated circuit chip 204 will be a 15 Hz square wave signal under non-alarm conditions. The waveform of the signal output at C is shown in FIG. 4. This signal is applied to transistor 228 which generates the 5 volt peak-to-peak 15 Hz signal at D as illustrated in FIG. 4. The signal at D is rectified to generate a 2 to 3 volt step voltage at E as shown in FIG. 4. As previously mentioned, the 2 to 3 volt signal at E is sufficient under non-alarm conditions to maintain switching transistor 258 ON. When transistor 258 is ON the base of transistor 264 is essentially grounded maintaining transistor 264 OFF.

With transistor 264 OFF a positive 12 volt DC potential appears at junction 268 which is applied through rectifier 270 to charge capacitor 276. In the preferred embodiment, capacitor 276 is selected to be 220 microfarads and resistors 278 and 280 are typically 220K and 330K respectively. Resistors 278 and 280 divide the 12 volt positive potential on capacitor 276 such that a potential of 8 volts DC appears on the base of transistor 274. The emitter of transistor 274 is connected by conductor 172 to a positive 6 volt DC potential generated by battery 156. Transistor 274 is thus reverse-biased since the positive voltage on the base is greater than the voltage on the emitter. Transistor 274 during non-alarm condition is therefore turned OFF. Capacitor 276 is an electrolytic capacitor and remains charged under normal or non-alarm conditions. The effective life of capacitor 276 is thereby increased.

Upon receipt of an alarm signal at the receiver, the signal transmitted over lines 22 through receiver 12 from transmitter 10 does not have a frequency shift, i.e., has the nominal frequency of ceramic resonator 36. Thus, there is no modulation signal of 15 Hz frequency to be recovered by integrated circuit chip 204. Thus there is no output signal at C,D,E. With no positive biasing potential on the base of transistor 258, transistor 258 turns OFF. With transistor 258 OFF, a positive biasing potential is applied through resistor 260 to the base of transistor 264. Transistor 264 turns ON and the voltage at junction point 268 foes substantially to zero. The charge on capacitor 276 begins to discharge through resistors 278 and 280. As capacitor 276 discharges, the positive potential applied to the base of transistor 274 begins to decrease. When the positive potential on the base of transistor 274 reaches approximately 5.4 volts, transistor 274 is turned on by the higher positive potential of 6 volts DC applied to its emitter from battery 156. When transistor 274 turns on an output signal is generated through voltage dividing resistors 284 and 282. The output signal is connected by a line 288 to an alarm. The values of capacitor 276 and resistors 278 and 280 are selected such that the nominal delay between the time at which the modulation of the signal from the receiver is terminated to the time at which an alarm signal is generated on line 288 is approximately 60 seconds. This 60 second time delay eliminates nuisance alarms that might otherwise trigger the alarm circuit. If the alarm system remains in the alarm condition for a period of time greater than 60 seconds one can be reasonably assured that the alarm signal represents a genuine alarm condition.

In the alarm system of the present invention, a loss of power will also trigger an alarm. In particular, upon power failure the 12 volts DC potential applied through diode 270 to capacitor 276 goes to zero. As in the case of the detection of an alarm condition at the receiver, capacitor 276 will discharge until, after a nominal 60 second delay, transistor 274 turns on. The 6 volt DC potential applied to the emitter of transistor 274 is generated by battery 156 that is unaffected by power failures. The charge on battery 156 is maintained by trickle charging circuit 158 and light emitting diode 156 provides a visual indication of adequate power remaining in battery 156. Time delay circuit 28 substantially eliminates false alarms due to momentary power failures.

The present invention combines the advantages of frequency shift keying for AC line noise immunity and a time delay alarm triggering circuit in an alarm system designed to transmit signals between remote locations over available power or communication lines. In addition to a selected alarm condition, the alarm system of the present invention also detects power failure within the system and generates an alarm signal indicative thereof. In the application of the present invention into livestock confinement buildings, power failure could be as significant a problem as other alarm conditions. For example, a power failure in a confinement building could precipitate a failure of environmental control apparatus that, if undetected, may severely affect the livestock.

In the preferred embodiment, a plurality of alarm channels may be utilized. In one particular embodiment of the present invention, five separate alarm channels are connected between transmitter and receiver over convenient power lines. For each separate channel an independent RF generator circuit 20, modulator circuit 18 and modulator disable circuit 24 are utilized in the transmitter 10 while separate receiver demodulator and rectifier circuits 26 and time delay circuits 28 are included in receiver 12. Each channel has a preselected nominal frequency typically between 200 and 240 KHz. Each channel may be associated with an independent alarm condition as previously indicated. Detection of an alarm condition on either channel will generate a time-delayed alarm signal. Additionally, the time delay circuit incorporated in the present invention maintains, during non-alarm conditions, a fully charged capacitor substantially eliminating any shelf life problems inherent in electrolytic devices. Each receiver circuit is provided with a ceramic resonator in the detection circuitry that is substantially immune from frequency shifts occurring as a result of temperature or handling of the apparatus.

We claim:

1. An alarm system for monitoring selected conditions at a remote location and providing a signal representative of the presence or absence of an alarm condition at the monitored location or power failure at either monitored or monitoring location, comprising:
   (a) a transmitter at said monitored location, said transmitter comprising:
      (i) frequency generator means for continuously generating a first output signal at a predetermined nominal frequency;
      (ii) means for modulating the frequency of said first output signal;
      (iii) means responsive to an alarm condition at said monitored location for disabling said frequency modulating means;
   (b) a receiver at said monitoring location connected to said transmitter, said receiver comprising:

(i) first circuit means for detecting the absence of modulation of said first output signal and generating a second output signal representative thereof;

(c) second circuit means responsive to said second output signal of said first circuit means and to loss of power for generating a time-delayed signal representative of said alarm condition or loss of power.

2. An alarm system for monitoring selected conditions at a remote location and providing a signal representative of the presence or absence of an alarm condition at the monitored location or power failure at either the monitored or monitoring location, comprising:

(a) a transmitter at said monitored location, said transmitter comprising:
 (i) frequency generator means for generating a first output signal at a predetermined nominal frequency;
 (ii) means for modulating the frequency of said first output signal;
 (iii) means responsive to an alarm condition at said monitored location for disabling said frequency modulating means;

(b) a receiver at said monitoring location, connected to said transmitter, said receiver comprising:
 (i) first circuit means for detecting the presence or absence of modulation of said first output signal and generating a second output signal representative thereof;

(c) second circuit means responsive to said second output signal of said first circuit means and to loss of power for generating a time-delayed signal representative of said alarm condition or loss of power, said second circuit means comprising:
 (i) switch means having a first state corresponding to non-alarm and power ON conditions and a second state corresponding to an alarm condition or power failure of said alarm system;
 (ii) time delay circuit means for switching said switch means between said first and said second states, said time delay circuit means having means for biasing said switch means in said first state in response to the presence of modulation of said first output signal and system power, said time delay circuit means operable a predetermined time following receipt of a signal indicating absence of modulation of said first output signal or power failure to switch said switch means to said second state whereby said switch means generates an alarm signal.

3. An alarm system in accordance with claim 2 wherein said time delay circuit means further comprises:

(a) a transistor having an emitter connected to a source of DC voltage of a first value, a collector, and a base;

(b) biasing circuit means connected to said base, said biasing circuit means including a capacitor connected in parallel with a voltage divider;

(c) switch means for providing a source of DC voltage to said biasing circuit, said switch means having a first position in which a voltage of a second value is supplied to said biasing circuit in response to the presence of modulation of said transmitter output signal and a second state in which potential applied to said biasing circuit has a third value representative of absence of modulation of said transmitter output signal or power failure at said monitored or said monitoring location.

4. An alarm system in accordance with claim 3 wherein said transistor is a P-N-P transistor and wherein said second potential is greater than said first potential, and wherein said third potential is zero, whereby under non-alarm and power ON conditions, said capacitor is charged to said second potential and said voltage divider generates a voltage on said base of said transistor greater than said first potential such that said transistor is turned OFF, and whereby upon application of said third potential to said biasing circuit in response to an alarm or power failure condition, said capacitor discharges through said voltage divider until said first potential exceeds said voltage applied to said base thereby turning said transistor ON and generating an output signal on said collector representative of said alarm or power failure condition.

5. An alarm system in accordance with claim 4 comprising:

(a) a battery connected to said emitter of said transistor to apply said first potential thereto;

(b) rectifying circuit connected to a source of AC power for generating said second voltage potential applied to said biasing circuit.

6. An alarm system for monitoring selected conditions at a remote location and providing a signal representative of the presence or absence of an alarm condition at the monitored location or power failure at either monitored or monitoring location, comprising:

(a) a transmitter at said monitored location, said transmitter comprising:
 (i) a ceramic resonator having an output signal with a nominal predetermined frequency;
 (ii) a timer circuit connected to said resonator for generating a frequency modulation signal;
 (iii) a capacitor selectively connected in parallel with said resonator;
 (iv) switch means connecting in series with said capacitor and responsive to said modulating signal for selectively connecting and disconnecting said capacitor in parallel with said ceramic resonator whereby said output frequency of said resonator is modulated about said nominal frequency at a rate corresponding to the frequency of said signal generated by said timer circuit
 (v) means responsive to an alarm condition at said monitored location for disabling said frequency modulating means;

(b) a receiver at said monitoring location connected to said transmitter, said receiver comprising:
 (i) first circuit means for detecting the presence or absence of modulation of said output signal of said ceramic resonator and generating a second output signal representative thereof;
 (ii) second circuit means responsive to said second output signal of said first circuit means and to loss of power for generating a time-delayed signal representative of said alarm condition or loss of power.

7. An alarm system in accordance with claim 6 wherein said means responsive to alarm condition comprises switch means connected between said timer circuit and said switch means for shunting said modulating signal to ground in response to the presence of an alarm condition.

8. An alarm system for transmitting an alarm signal between remotely located points, comprising:

(a) a transmitter, said transmitter having means for generating a first signal in response to detection of an alarm condition;
(b) a receiver connected to said transmitter and having means for detecting the presence or absence of said first signal and generating a second signal representative of the presence of said first signal; and
(c) an alarm trigger circuit having a circuit means responsive to said second signal and to loss of power for generating a time-delayed alarm signal, said alarm trigger circuit comprising:
  (i) switch means having a first state corresponding to non-alarm and power ON conditions and a second state corresponding to an alarm condition or power failure of said alarm system; and
  (ii) time delay circuit means for switching said switching means between said first and said second states, said time delay circuit means having means for biasing said switch means in said first state and switching said switch means to said second state following a predetermined time following receipt of said second signal or power failure.

9. An alarm system in accordance with claim 8 wherein said time delay circuit means comprises:
  (a) a transistor having an emitter connected to a source of DC voltage having a first value, a collector, and a base;
  (b) biasing circuit means connected to said base, said biasing circuit means including a capacitor connected in parallel with a voltage divider; and
  (c) switch means for providing a source of DC voltage to said biasing circuit, said switch means having a first state in which a voltage of a second value is applied to said biasing circuit and a second state to which said switch means is switched in response to said second signal or power failure, said switch means in said second state applying a voltage of a third value to said biasing circuit.

* * * * *